UNITED STATES PATENT OFFICE.

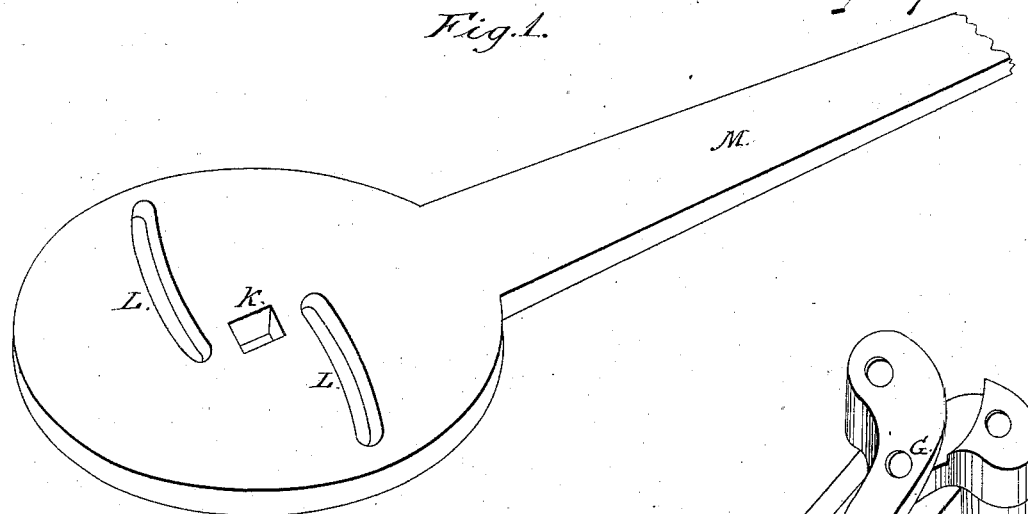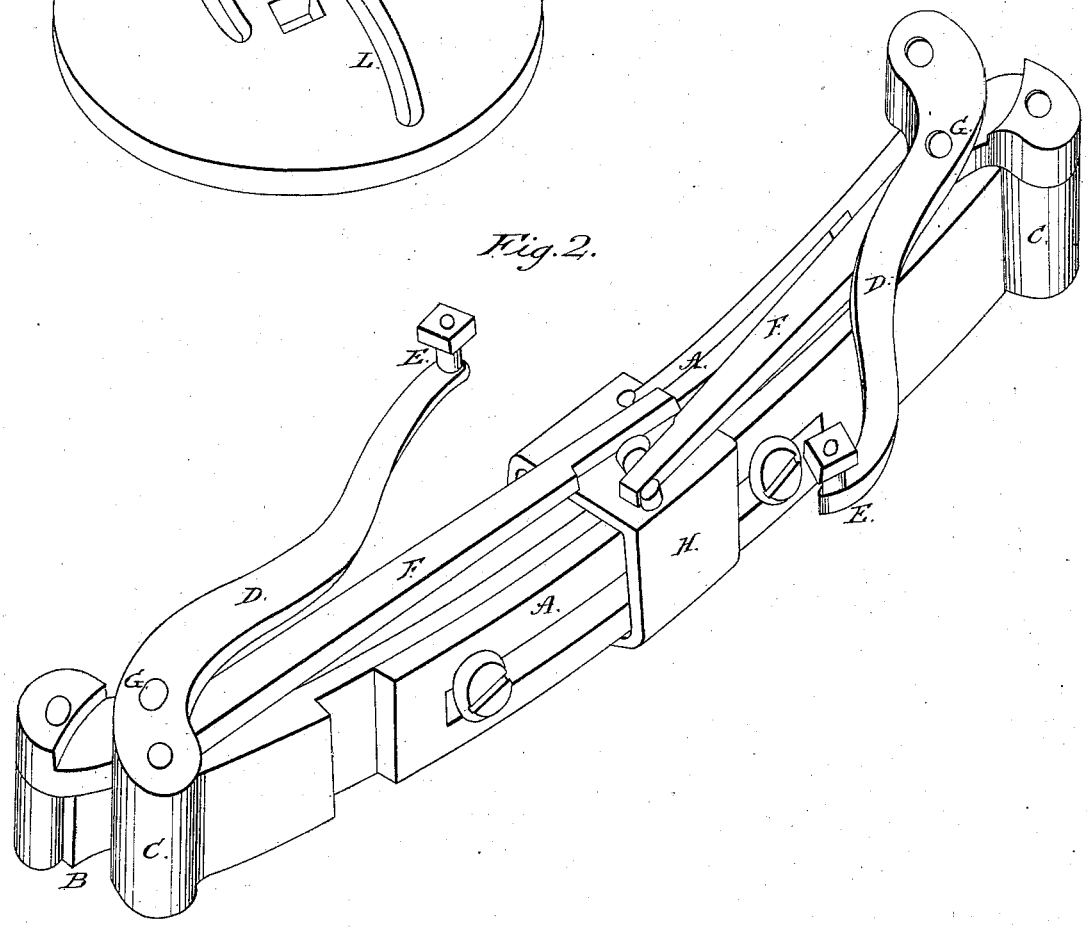

O. S. COWLES, OF TECONSHA TOWNSHIP, AND A. L. DEMING, OF HOMER TOWNSHIP, CALHOUN COUNTY, MICHIGAN.

CLAMPING AND UPSETTING TIRES.

Specification of Letters Patent No. 15,558, dated August 19, 1856.

*To all whom it may concern:*

Be it known that we, OSCAR L. COWLES, of the township of Teconsha, and ALLAN L. DEMING, of the township of Homer, both of the county of Calhoun and State of Michigan, have invented a new and useful improvement on the machine for upsetting tires, thus obviating the necessity of cutting and welding the same when it becomes too large for the wheel; and we do hereby declare that the following is a full, clear, and exact description of the same in its construction and operation, reference being had to the annexed drawings, making a part of this specification, in which—

Figure 1 is a perspective view of the slotted working lever, broken off short and detached from the machine, and Fig. 2 represents the machine in perspective in working order with the lever removed.

We usually construct our machines entirely of wrought iron; for lightness and portability, and also to facilitate the construction and repairing by country blacksmiths, who have not always easy access to foundries or machine shops.

The machine we have for ordinary use, weighs about 25 lbs. and is constructed as follows: The two clamping bars A A, Fig. 2, from 12 to 15 inches long, are bent to a circle whose radius is the medium radius of the tire in common use, and have one short spur B on the inside, at each end to hold the tire when upsetting. Each bar is composed of two portions, half lapped together, the outer overlapping half being slotted to allow of longitudinal expansion and contraction, and connected to the inner half by two bolts passing through the slot, and fulled out as shown at C to receive a pivot bolt. Two auxiliary clamping levers D D with a carrying stud E E at the extremity of each arm are lapped and jointed in pairs to two connecting bars F F; (a lever to a bar,) by a pivot bolt, passing through each other at G, forming the fulcrum, and are jointed at each extremity outside this fulcrum, to the clamping bars, by a pivot bolt, passing through the fulled parts C C; the whole resembling two pair of tongs lying in reversed position on the upper edges of the clamping bars, said bars being in effect but a mere jointed contination of the jaws of the tongs. The saddle piece H is a socket inclosing the clamping bars in the center and wide enough to allow them room to separate sufficiently to admit the thickest tire. It has a round hole in the middle of its upper surface to receive the end of the pivot bolt of the main slotted lever, Fig. 1, and two short studs to confine laterally, the ends of the connecting bars F F which rest on it, one on each side of the center bolt, which rotates with the main slotted lever. This lever is represented in Fig. 1. It has a square hole in the center of its head K for the reception of a square necked bolt, the lower end of which passes through the saddle piece, and has two radial slots L L, one on each side of the center and radiating from the center on opposite sides. Those slots form an arc of a circle equal in length to the travel of the studs, E E and of equal radius. The said carrying studs of the levers D D pass through these slots and traverse the entire length; they are secured by a nut on the upper side of the lever. The clamping bars may be set to take in different thickness of tire by using a different diameter of bolt, passing through and rotating between the ends of the connecting bars.

The mode of operating this machine, is as follows: The tire being heated when it is desired to be upset, and placed in a horizontal position, the clamping bars fully open or dropped over it and brought together by rotating the slotted lever, nearly a quarter of a revolution, causing the carrying studs on the ends of levers D D to traverse the slots L L from the periphery to the center. The arms of the levers D D being now in line with each other and with the clamping bars, and the carrying studs being nearly opposite the center at right angles with the machine the tire is now clamped, and the upsetting precess begins; a further rotation of the slotted lever, by the studs being stopped at the inner extremity of the slots, draws the two overlapped halves of the clamping bars together and thus upsets the tire to the desired extent; the tire is then liberated and the machine set ready for another operation by a reverse motion of the slotted lever.

We claim for this invention the merit of extreme simplicity, compactness, effective power and great rapidity of action. It can be built or repaired by any ordinary blacksmith at a trifling expense, and has great leverage for the amount of travel and of space occupied, as one quarter revolution of a three feet lever, clamps the tire and upsets it before it has parted with any of its heat.

We are aware that machines have been in use for clamping and upsetting tire by the use of levers and screws, for that purpose, requiring several distinct motions by hand to effect it; and we therefore, do not claim, clamping tire, or iron for the express purpose of upsetting it when so clamped, but What we do claim as our invention and desire to secure by Letters Patent is—

The combination of the lever Fig. 1, with the auxiliary clamping levers D D Fig. 2, the carrying studs E E, the connecting bars F F, the saddle piece H, and the slotted clamping bars A, A, for the purpose of clamping and then upsetting tire by a single continuous motion of the slotted lever Fig. 1, as heretofore described and set forth.

OSCAR L. COWLES.
ALLAN L. DEMING.

Attest:
JOSEPH C. FRINK,
GEORGE JOHNSON.